US010816660B2

(12) United States Patent
Schwert et al.

(10) Patent No.: US 10,816,660 B2
(45) Date of Patent: Oct. 27, 2020

(54) CLOSE RANGE FILTERING VEHICLE RADAR

(71) Applicant: VEONEER SWEDEN AB, Vargarda (SE)

(72) Inventors: Christian Schwert, Haßfurt (DE); Dirk Klotzbuecher, Mainstockheim (DE)

(73) Assignee: VEONEER SWEDEN AB, Vargarda (SE)

( * ) Notice: Subject to any disclaimer, the term of this patent is extended or adjusted under 35 U.S.C. 154(b) by 303 days.

(21) Appl. No.: 15/756,838

(22) PCT Filed: Aug. 31, 2016

(86) PCT No.: PCT/EP2016/070485
§ 371 (c)(1),
(2) Date: Mar. 1, 2018

(87) PCT Pub. No.: WO2017/037100
PCT Pub. Date: Mar. 9, 2017

(65) Prior Publication Data
US 2018/0267164 A1    Sep. 20, 2018

(30) Foreign Application Priority Data

Sep. 2, 2015  (EP) .................................... 15183546

(51) Int. Cl.
*G01S 13/931* (2020.01)
*G01S 7/35* (2006.01)
(Continued)

(52) U.S. Cl.
CPC ............ *G01S 13/931* (2013.01); *G01S 7/352* (2013.01); *G01S 13/34* (2013.01); *G01S 13/342* (2013.01);
(Continued)

(58) Field of Classification Search
CPC ........ G01S 13/931; G01S 13/87; G01S 13/88; G01S 13/953; G01S 13/64; G01S 13/92;
(Continued)

(56) References Cited

U.S. PATENT DOCUMENTS 7,385,550 B2   6/2008  Winter et al.
7,663,534 B2   2/2010  Hilsebecher et al.
(Continued)

FOREIGN PATENT DOCUMENTS

WO  WO 2004/029650 A1  4/2004
WO  WO 2005/124391 A1  12/2005
WO  WO 2014/123112 A1  8/2014

OTHER PUBLICATIONS

International Search Report and Written Opinion of PCT/EP2016/070485, dated Nov. 24, 2016.

*Primary Examiner* — Olumide Ajibade Akonai
(74) *Attorney, Agent, or Firm* — Dickinson Wright PLLC

(57) ABSTRACT

A vehicle radar system (3, 3') and related method including a transceiver arrangement (7, 7') that is arranged to generate and transmit at least a first radar signal over a cycle (4a) and a following second radar signal over a cycle (4b). For the first radar signal cycle (4a), a corresponding first received signal (5a) and corresponding first received signal information (20a, 28a) is obtained, and for a following second radar signal cycle (4b), a corresponding second received signal (5b) and corresponding second received signal information (20b, 28b) is obtained. The vehicle radar system (3, 3') is arranged to calculate a difference between the first received signal information (20a, 28a) and the second received signal information (20b, 28b).

14 Claims, 5 Drawing Sheets

(51) Int. Cl.
*G01S 13/538* (2006.01)
*G01S 13/34* (2006.01)

(52) U.S. Cl.
CPC ....... *G01S 13/538* (2013.01); *G01S 2007/356* (2013.01); *G01S 2013/93185* (2020.01)

(58) Field of Classification Search
CPC .... G01S 13/935; G01S 13/42; G01S 13/2013; G01S 13/93185; G01S 13/56; G01S 13/584; G01S 2007/356
See application file for complete search history.

(56) References Cited

U.S. PATENT DOCUMENTS

| | | |
|---|---|---|
| 9,891,316 B2 | 2/2018 | Mizutani et al. |
| 2006/0044177 A1* | 3/2006 | Wittenberg ........... G01S 13/426 342/25 A |
| 2009/0046001 A1* | 2/2009 | Beilin .................. G01S 13/227 342/160 |
| 2010/0026559 A1* | 2/2010 | Siegel .................. G01S 7/2923 342/159 |
| 2010/0295722 A1* | 11/2010 | Shingyoji ............. G01S 13/931 342/70 |
| 2013/0214963 A1* | 8/2013 | Vacanti ................. G01S 7/038 342/120 |
| 2015/0084808 A1* | 3/2015 | Vacanti ................. G01S 13/36 342/122 |
| 2015/0338507 A1* | 11/2015 | Oh ........................ G01S 7/354 342/159 |

\* cited by examiner

CLOSE RANGE FILTERING VEHICLE RADAR

CROSS-REFERENCE TO RELATED APPLICATIONS

This application is a 35 U.S.C. § 371 national phase application of PCT International Application No. PCT/EP2016/070485, filed Aug. 31, 2016, which claims the benefit of priority under 35 U.S.C. § 119 to European Patent Application No. 15183546.9, filed Sep. 2, 2015, the contents of which are incorporated herein by reference in their entirety.

FIELD OF THE INVENTION

The present disclosure relates to a vehicle radar system comprising a transceiver arrangement that is arranged to generate and transmit at least a first radar signal cycle and a following second radar signal cycle. For the first radar signal cycle, a corresponding first received signal and corresponding first received signal information is obtained, and for a following second radar signal cycle, a corresponding second received signal and corresponding second received signal information is obtained.

BACKGROUND

Many vehicle radar systems include radar transceivers that are arranged for generating radar signals, for example so-called chirp signals that are transmitted, reflected and received by use of appropriate antennas of the radar system. A chirp signal is an FMCW (Frequency Modulated Continuous Wave) signal with a certain amplitude where the frequency is continuously ramped between two values, the chirp signal thus being in the form of a continuous sinusoid where the frequency varies from a first low frequency to a second high frequency over the course of the ramp. Alternatively the ramp may be such that the frequency varies from a first high frequency to a second low frequency. The magnitude of the change in frequency from start to finish may for example be of the order of 0.5% of the starting frequency.

The received signals, thus constituted by reflected radar echoes, are mixed with the transmitted chirp signal in order to convert the received signals to baseband signals. These baseband signals, or IF (Intermediate Frequency) signals, are amplified and transferred in a plurality of channels to an Analog to Digital Converter (ADC) arrangement which is arranged to convert the received analog signals to digital signals. The digital signals are used for retrieving an azimuth angle of possible targets by simultaneously sampling and analyzing phase and amplitude of the received signals. The analysis is generally performed in one or more Digital Signal Processors (DSP) by Fast Fourier Transform (FFT) processing.

The radar signals are transmitted at a wavelength having a magnitude of, for example one or a few centimeters, which is advantageous in order to be able to effectively avoid collisions. This also enables detection of objects that are close to the vehicle where a radar system is used. Due to reflections and multipath due to the vehicle itself, as well as collected dirt and similar, internal coupling of signals within the radar system, stationary objects that are close to the vehicle are detected and processed, which is disadvantageous since it these objects constitute unimportant detection and causes unnecessary data processing and can cause false association with a real desired object detection. These undesired detections cannot be distinguished from desired detections from close real objects.

The object of the present disclosure is thus to provide a vehicle radar system where such close stationary objects are removed at an early stage, avoiding the above disadvantages.

SUMMARY

The above-presented object is achieved by use of a vehicle radar system including a vehicle radar system having a transceiver arrangement that is arranged to generate and transmit at least a first radar signal cycle and a following second radar signal cycle. For the first radar signal cycle, a corresponding first received signal and corresponding first received signal information is obtained, and for a following second radar signal cycle, a corresponding second received signal and corresponding second received signal information is obtained. Furthermore, the vehicle radar system is arranged to calculate a difference between the first received signal information and the second received signal information.

This object is also achieved by a method for a vehicle radar system, where the method includes:
Generating and transmitting at least a first radar signal cycle and a following second radar signal cycle;
Obtaining a corresponding first received signal and corresponding first received signal information for the first radar signal cycle;
Obtaining a corresponding second received signal and corresponding second received signal information for the following second radar signal cycle; and
Calculating a difference between the first received signal information and the second received signal information.

According to an example of the present invention, the vehicle radar system is arranged to:
Mix and filter the received signals with respective transmitted radar signals to obtain at least one filtered IF (Intermediate Frequency) signal.
Convert the filtered IF signals to digital IF signals.
Convert the digital IF signals to a range domain by use of a first FFT (Fast Fourier Transform).
Combine the results from successive radar signal cycles into the Doppler domain by use of a second FFT, such that a plurality of corresponding Range-Doppler matrices is obtained.

According to another example of the present invention, the first received signal information is constituted by received digital IF signals for a first radar signal cycle and that the second received signal information is constituted by received digital IF signals for a second radar signal cycle.

According to another example of the present invention, the vehicle radar system is arranged to:
Store first received digital IF signals for a first radar signal cycle and second received digital IF signals for a second radar signal cycle;
Calculate a difference between the first received digital IF signals and the second received digital IF signals; and
Forward resulting signal information to a DSP arrangement.

According to another example of the present invention, the first received signal information is constituted by an output of a DSP arrangement for a first radar signal cycle. Furthermore, the second received signal information is constituted by an output of the DSP arrangement for a second radar signal cycle. The output of the DSP arrangement includes Range-Doppler matrices.

According to another example of the present invention, the vehicle radar system is arranged to:
  Store a first output of the DSP arrangement for a first radar signal cycle and a second output of the DSP arrangement for a second radar signal cycle;
  Calculate a difference between the first output and the second output information; and
  Forward resulting signal information for further handling.

According to another example of the present invention, each radar signal cycle includes an FMCW chirp signal cycle, where each chirp signal cycle includes a corresponding plurality of frequency ramps. Each frequency ramp is arranged to run between a first frequency and a second frequency.

Other examples are disclosed in the following description and the appended drawings.

A number of advantages are obtained by use of the present disclosure. Mainly, a vehicle radar system is provided where close stationary objects are discarded in a reliable an uncomplicated manner.

BRIEF DESCRIPTION OF THE DRAWINGS

The present disclosure will now be described more in detail with reference to the appended drawings, where.

DETAILED DESCRIPTION

Figure 1:
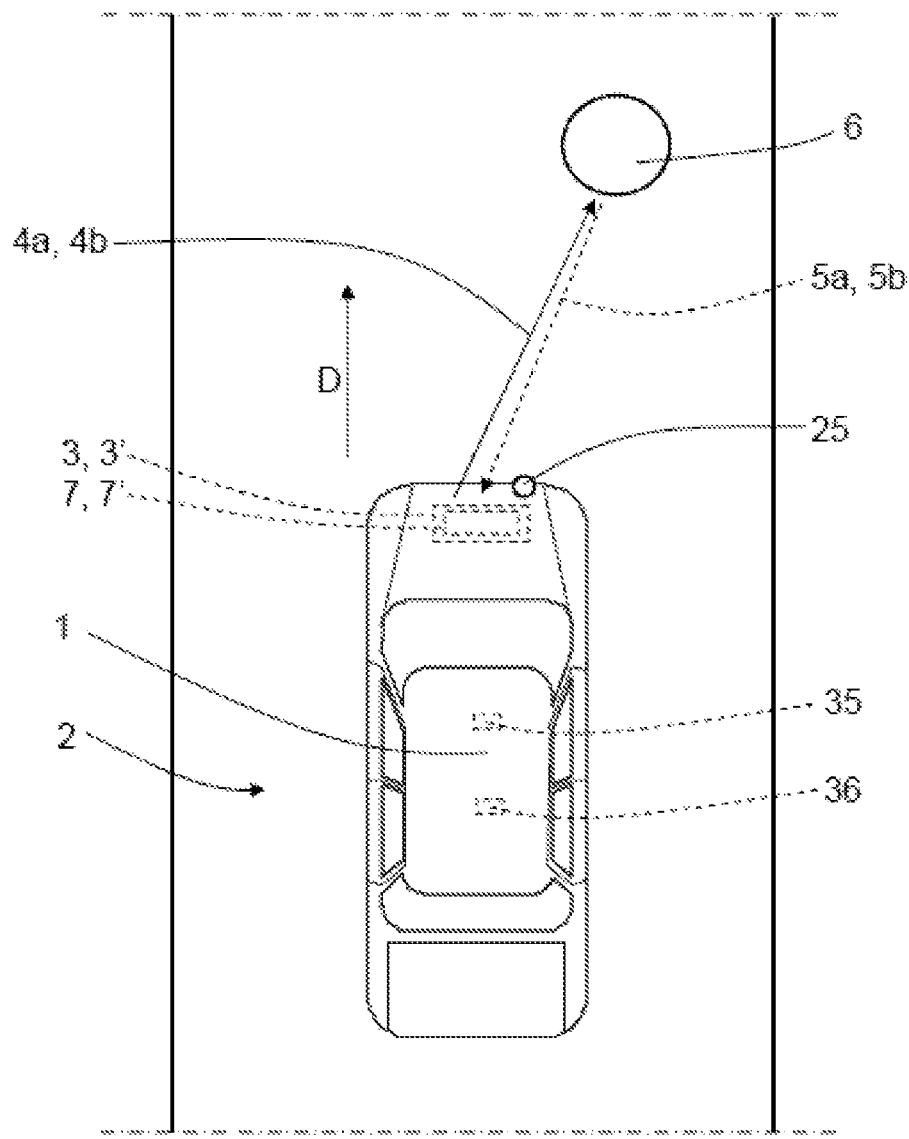
FIG. 1 shows a schematic top view of a vehicle.

FIG. 1 schematically shows a top view of a vehicle 1 arranged to run on a road 2 in a direction D, where the vehicle 1 includes a vehicle radar system 3 which is arranged to distinguish and/or resolve single targets from the surroundings by transmitting signals 4a, 4b and receiving reflected signals 5a, 5b and using a Doppler effect in a previously well-known manner. The vehicle radar system 3 is arranged to provide azimuth angles of possible objects 25, 6 by simultaneously sampling and analyzing phase and amplitude of the received signals 5a, 5b. Here, there is a relatively distant object 6 that may be moving and a close stationary object 25. The close stationary object 25 may be due to reflections and multipath due to the vehicle 1 itself, as well as collected dirt and/or similar.

Figure 2:
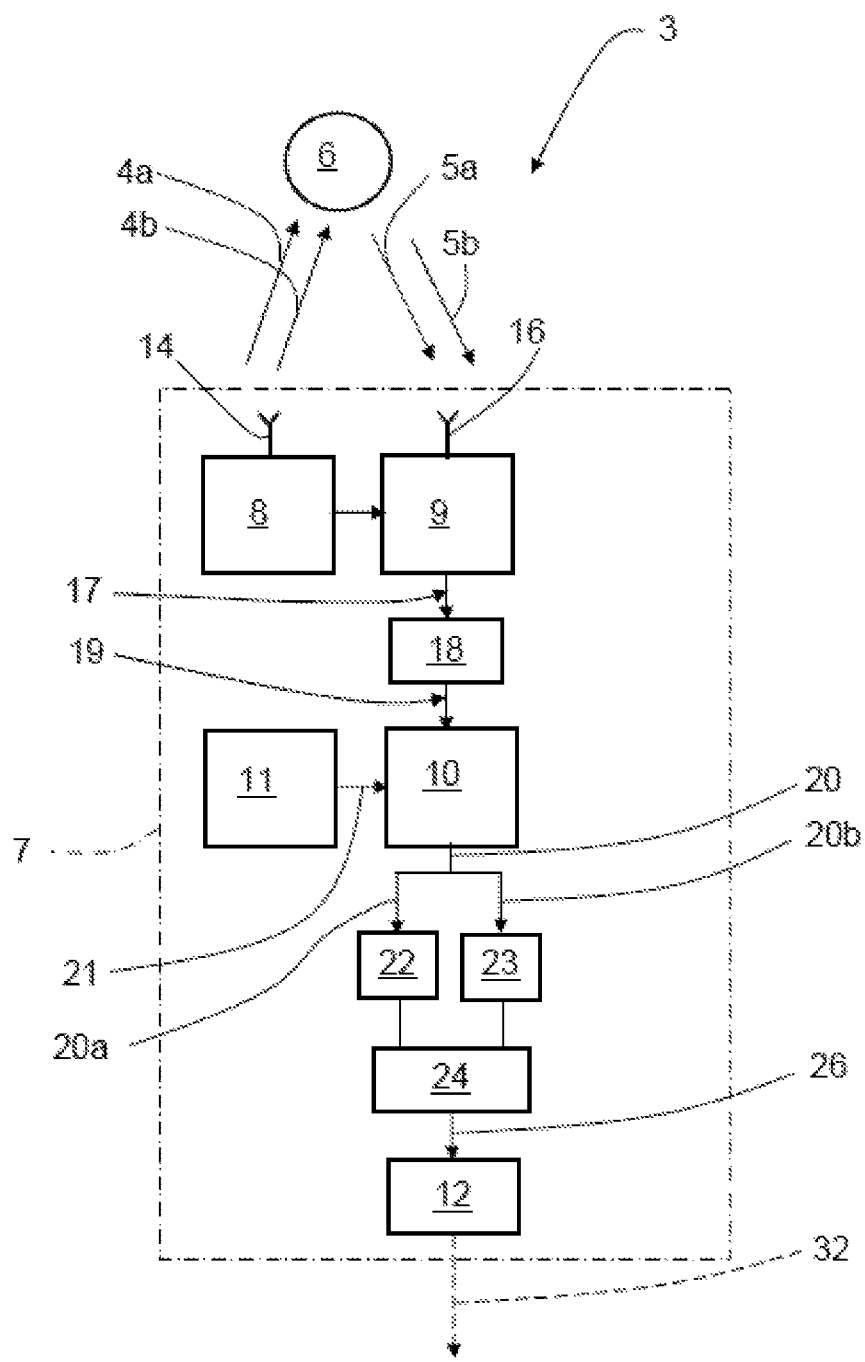
FIG. 2 shows a simplified schematic of a vehicle radar system according to a first example.

With reference also to FIG. 2, the vehicle radar system 3 includes a transceiver arrangement 7 that is arranged for generating and transmitting sweep signals in the form of FMCW (Frequency Modulated Continuous Wave) chirp signals 4a, 4b of a previously known kind, and to receive reflected signals 5a, 5b, where the transmitted chirp signals 4a, 4b have been reflected by an object 6.

The transceiver arrangement 7 includes a transmitter 8 with a transmit antenna arrangement 14, a receiver 9 with a receiver antenna arrangement 16, an Analog to Digital Converter (ADC) arrangement 10 and sampling and timing arrangement 11.

Figure 3:
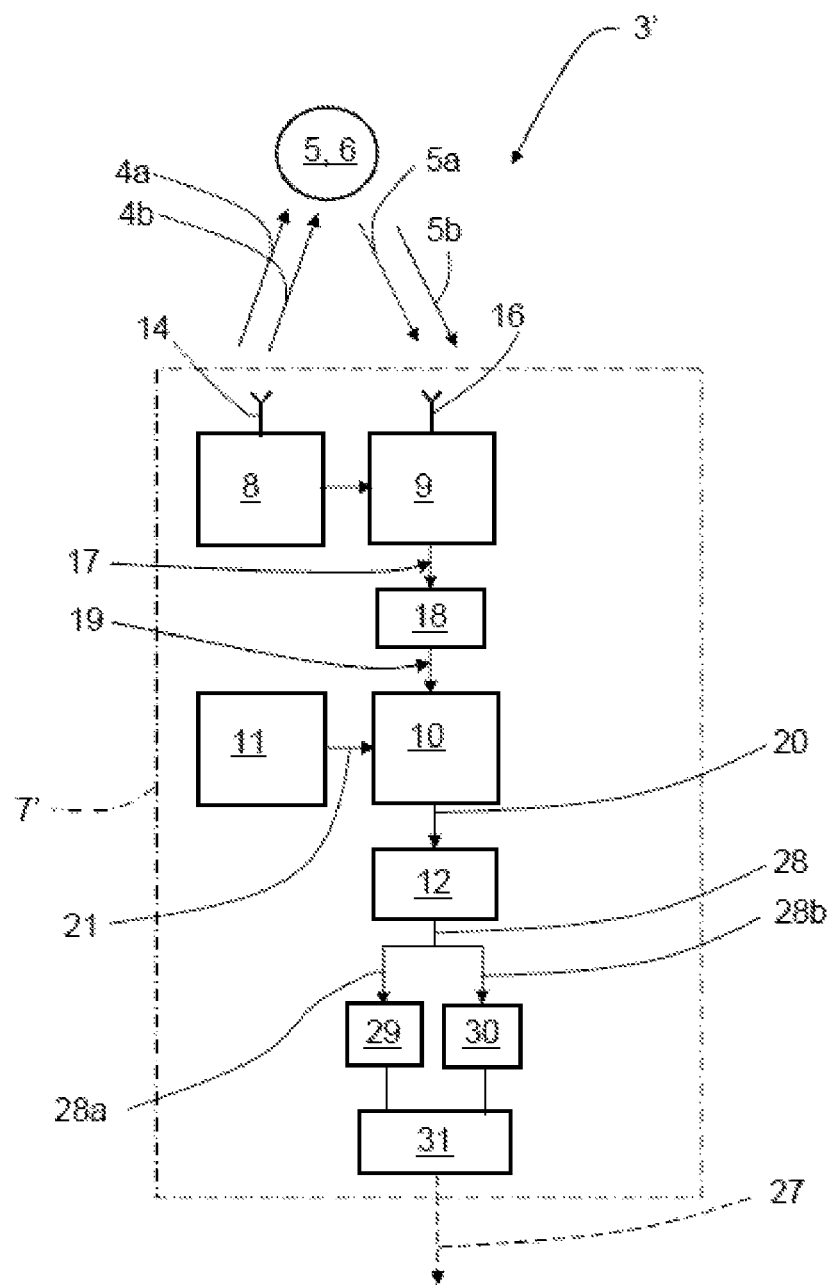
FIG. 3 shows a simplified schematic of a vehicle radar system according to a second example.
Figure 4:
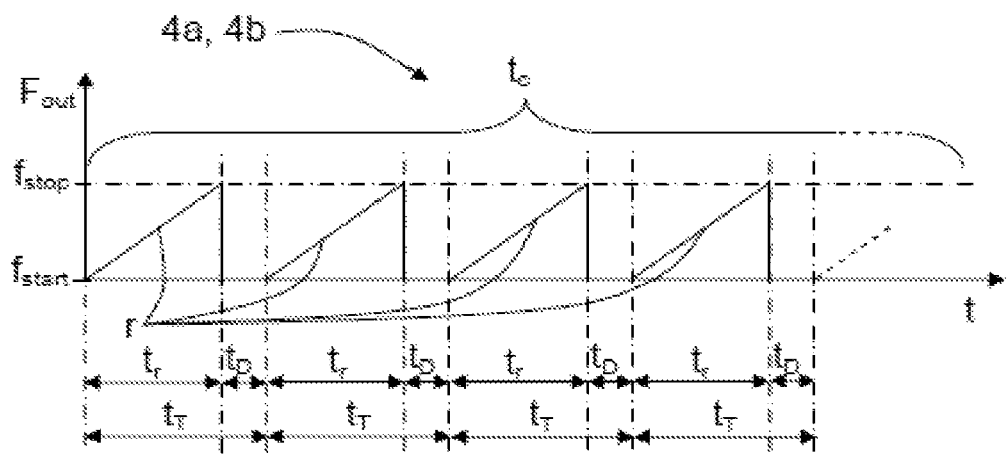
FIG. 4 shows a chirp signal.

As shown in FIG. 3, a transmitted chirp signal 4a, 4b is in the form of a continuous sinusoid where the output frequency $F_{out}$ varies from a first frequency $f_{start}$ to a second frequency $f_{stop}$ over the course of a ramp r, where each chirp signal 4a, 4b includes repeating cycles of a plurality of frequency ramps r. There the magnitude of the first frequency $f_{start}$ falls below the magnitude of the second frequency $f_{stop}$.

A cycle for a chirp signal 4a, 4b lasts for a certain cycle time $t_c$, each ramp r lasts a certain ramp time $t_r$, having a ramp period time $t_T$. Between two consecutive ramps of the chirp signal 4a, 4b there is a delay time $t_D$.

Referring back to FIG. 2, the reflected signals 5a, 5b are received by the receiver 9 via the receiver antenna arrangement 16. The received signals 5a, 5b, thus constituted by reflected radar echoes, are then mixed with the transmitted chirp signals 4a, 4b in the receiver 9.

In this way, an IF (Intermediate Frequency) signal 17 is acquired and filtered in an IF filter 18 such that a filtered IF signal 19 is acquired.

The difference frequency of the filtered IF signal 19 relates to the target distance and is transferred to the corresponding ADC arrangement 10, where the filtered IF signal 19 is sampled at a certain predetermined sampling frequency $f_s$ and converted to a digital IF signal 20, the sampling frequency $f_s$ being provided in the form of a sampling and timing signal 21 produced by the sampling and timing arrangement 11.

The sampling and timing arrangement 11 is connected to a DSP arrangement 12 that is adapted for radar signal processing by use of a first FFT (Fast Fourier Transform) to convert the digital IF signals 20 to a range domain, and a second FFT to combine the results from successive chirp signal ramps into the Doppler domain. This results in an output 32 including Range-Doppler matrices that are transferred for further processing, which is not further discussed here, many examples of such further processing being well-known in the art.

According to the present disclosure of embodiments of the present invention, with reference to FIG. 2 and FIG. 3, for a first chirp signal cycle 4a, a corresponding first received signal 5a and corresponding first received signal information 20a, 28a is obtained, and for a following second chirp signal cycle 4b, a corresponding second received signal 5b and corresponding second received signal information 20b, 28b is obtained, where a control unit 24, 31 is arranged to calculate a difference between the first received signal information 20a, 28a and the second received signal information 20b, 28b.

By use of this calculation, resulting signal information 26, 27 is obtained, where close stationary objects 25 have been removed. This is due to the fact that between two such chirp signal cycles 4a, 4b, close stationary objects 25 tend to present a similar detected position, while more distant objects 6 present different detected positions due to the vehicle's movement as well as the more distant objects' movements if they are moving.

In the following, two different examples presenting two different kinds of received signal information 20a, 20b; 28a, 28b and resulting signal information 26, 27 will be described.

According to a first example embodiment of the present invention, with reference to FIG. 2, the calculation of the difference between the first received signal information 20a and the second received signal information 20b is performed on the digital IF signals 20, where first received digital IF signals 20a for a first chirp signal cycle 4a are stored into a first memory 22 and second received digital IF signals 20b for a second chirp signal cycle 4b are stored into a second memory 23. A control unit 24 is arranged to calculate a difference between the first received digital IF signals 20a and the second received digital IF signals 20b, and to forward the resulting signal information 26 to the DSP arrangement 12.

According to a second example embodiment of the present invention, with reference to FIG. 3, the vehicle radar system 3' includes a transceiver arrangement 7' where the calculation of the difference between the first received signal information 28a and the second received signal information 28b is performed on an output 28 of the DSP arrangement 12, where this output includes Range-Doppler matrices as described previously with reference to FIG. 2. A first output 28a of the DSP arrangement 12 for a first chirp signal cycle 4a is stored into a first memory 29 and a second output 28b of the DSP arrangement 12 for a second chirp signal cycle 4b is stored into a second memory 30. A control unit 31 is arranged to calculate a difference between the first output 28a and the second output 28b, and to forward the resulting signal information 27 for further handling.

This means that in the first example embodiment of the present invention, the received signal information 20a, 20b is in the form of digital IF signals, and in the second example the received signal information 28a, 28b is in the form of DSP output including Range-Doppler matrices. Normally, each chirp signal cycle results in a Range-Doppler matrix. Furthermore, in the first example the resulting signal information 26 includes a difference between two different digital IF signals 20a, 20b, and in the second example, the resulting signal information 27 includes a difference between two different DSP outputs 28a, 28b.

From a signal processing point of view, the first example discloses calculation of a difference between the rawest data available without any additional effects, for example scalloping losses from the FFT.

The second example embodiment of the present invention discloses calculation of a difference between data obtained after a spectral analysis, which reduces the required size of the memories 22, 23; 29, 30 since after the spectral analysis, it is not necessary to consider all data but only data from the range of interest. In the present example the range of interest is only a small section of the overall range, for example in the magnitude of 2 meters out of 100 meters.

As indicated in FIG. 1, the vehicle 1 includes a safety control unit 35 and safety system 36, for example an emergency braking system and/or an alarm signal device. The safety control unit 35 is arranged to control the safety system 36 in dependence of input from the radar system 3.

Figure 5:
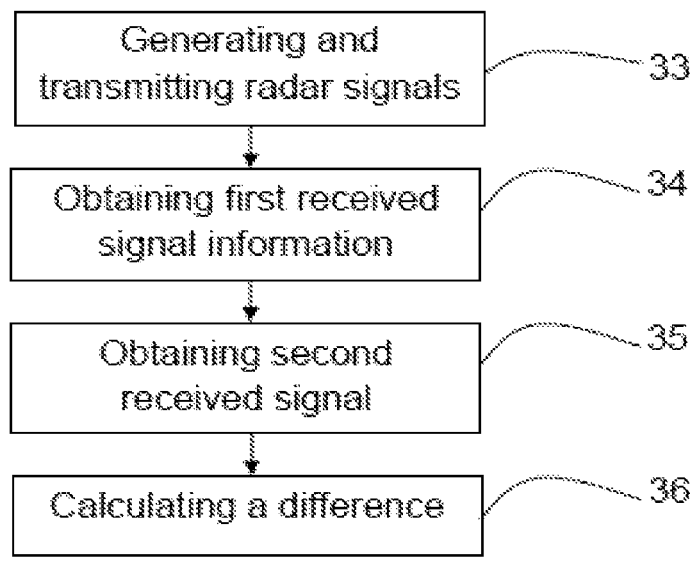
FIG. 5 shows a flowchart for a method according to the present disclosure.

With reference to FIG. 5, the present disclosure relates to a method, where the method includes the following steps:

Step 33: Generating and transmitting at least a first radar signal cycle 4a and a following second radar signal cycle 4b;

Step 34: Obtaining a corresponding first received signal 5a and corresponding first received signal information 20a, 28a for the first radar signal cycle 4a.

Step 35: Obtaining a corresponding second received signal 5b and corresponding second received signal information 20b, 28b for the following second radar signal cycle 4b.

Step 36: Calculating a difference between the first received signal information 20a, 28a and the second received signal information 20b, 28b.

Figure 6:
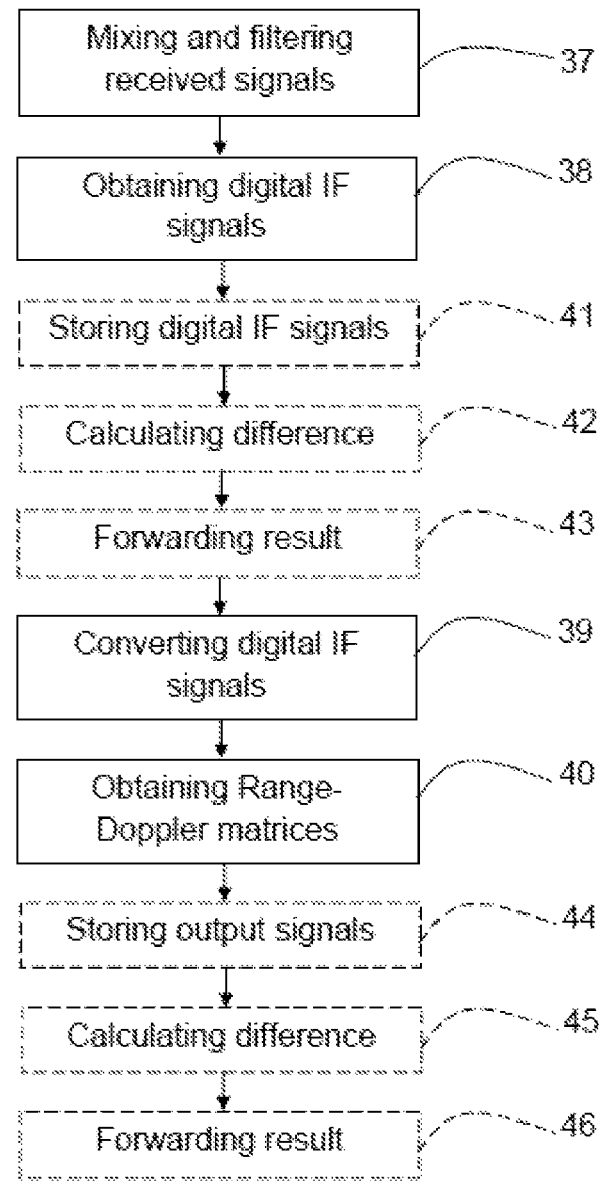
FIG. 6 shows a flowchart illustrating examples of methods according to the present disclosure.

With reference to FIG. 6, according to an example embodiment of the present invention, the method further includes:

Step 37: Mixing and filtering the received signals 5a, 5b with respective transmitted radar signals 4a, 4b to obtain at least one filtered IF (Intermediate Frequency) signal 19.

Step 38: Converting the filtered IF signals 17, 19 to digital IF signals 20.

Step 39: Converting the digital IF signals 20 to a range domain by use of a first FFT (Fast Fourier Transform).

Step 40: Combining the results from successive radar signal cycles into the Doppler domain by use of a second FFT, such that a plurality of corresponding Range-Doppler matrices is obtained.

According to another example embodiment of the present invention, the method further includes:

Step 41: Storing first received digital IF signals 20a for a first radar signal cycle 4a and second received digital IF signals 20b for a second radar signal cycle 4b.

Step 42: Calculating a difference between the first received digital IF signals 20a and the second received digital IF signals 20b.

Step 43: Forwarding resulting signal information 26 to a DSP arrangement 12.

According to another alternative example embodiment of the present invention, the method includes:

Step 44: Storing a first output 28a of the DSP arrangement 12 for a first radar signal cycle 4a and a second output 28b of the DSP arrangement 12 for a second radar signal cycle 4b.

Step 45: Calculating a difference between the first output 28a and the second output information 28b.

Step 46: Forwarding resulting signal information 27 for further handling.

The present disclosure is not limited to the examples above, but may vary freely within the scope of the present invention. For example, the chirp signal ramps shown is only an example; they may for example be configured as up-ramp as described, or as down-ramps, or some combination of both. There may not be any delay time to between consecutive ramps.

The calculation does not have to be performed by a separate control unit, but may be performed by the DSP arrangement 12 itself, or by any other kind of combined control unit. In the first example, this means that the resulting signal information 26 is forwarded within the DSP arrangement 12.

Generally, the vehicle radar system 3, 3' is arranged to calculate a difference between the first received signal information 20a, 28a and the second received signal information 20b, 28b.

The memories may for example be part of a larger common memory unit, the DSP arrangement 12 or one or more control units. The received signal information may be directed to one common memory unit by one common connection and not divided to two different memories as shown in FIG. 2 and FIG. 3. The embodiment with separate memories 22, 23; 29, 30 and a separate control unit 24, 31 is used in the examples to enhance the understanding of the present disclosure The radar system may be implemented in any type of vehicle such as cars, trucks and buses as well as boats and aircraft.

The schematics of vehicle radar systems are simplified, only showing parts that are considered relevant for an adequate description of the present disclosure. It is understood that the general design of radar systems of this kind is well-known in the art.

The number of antenna arrangements, antennas within each antenna arrangement and IF signals may vary. Each antenna arrangement 14, 16 may for example include one or more antennas, and each antenna may be constituted by one antenna element or by an array of antenna elements.

The ADC arrangement and the DSP arrangement should each one be interpreted as having a corresponding ADC or DSP functionality, and may each be constituted by a plurality of separate components. Alternatively, each ADC arrangement may be comprised in one ADC chip, and each DSP arrangement may be comprised in one DSP chip.

The following second chirp signal cycle 4b may follow directly after the first chirp signal cycle 4a, or after a certain delay time or after one or more intermediate chirp signal cycles.

Although the above description has been directed towards FMCW, any suitable radar signal is possible, for example pulsed radar, FSK (Frequency Shift Keying), stepped frequency, BPSK (Binary Phase Shift Keying) etc. The radar signal used should however be run in at least two cycles such that the difference between the corresponding received signal information 20a, 28a; 20b, 28b may be calculated.

Generally, the present disclosure relates to a vehicle radar system 3, 3' including a transceiver arrangement 7, 7' that is arranged to generate and transmit at least a first radar signal cycle 4a and a following second radar signal cycle 4b, where, for the first radar signal cycle 4a, a corresponding first received signal 5a and corresponding first received signal information 20a, 28a is obtained, and for a following second radar signal cycle 4b, a corresponding second received signal 5b and corresponding second received signal information 20b, 28b is obtained. The vehicle radar system 3, 3' is arranged to calculate a difference between the first received signal information 20a, 28a and the second received signal information 20b, 28b.

According to an example, the vehicle radar system 3, 3' is arranged to:
Mix and filter the received signals 5a, 5b with respective transmitted radar signals 4a, 4b to obtain at least one filtered IF (Intermediate Frequency) signal 19;
Convert the filtered IF signals 17, 19 to digital IF signals 20;
Convert the digital IF signals 20 to a range domain by use of a first FFT (Fast Fourier Transform); and to
Combine the results from successive radar signal cycles into the Doppler domain by use of a second FFT, such that a plurality of corresponding Range-Doppler matrices is obtained.

According to an example embodiment of the present invention, the first received signal information 20a is constituted by received digital IF signals 20a for a first radar signal cycle 4a and that the second received signal information 20b is constituted by received digital IF signals 20b for a second radar signal cycle 4b.

According to an example embodiment of the present invention, the vehicle radar system 3, 3' is arranged to:
Store first received digital IF signals 20a for a first radar signal cycle 4a and second received digital IF signals 20b for a second radar signal cycle 4b,
Calculate a difference between the first received digital IF signals 20a and the second received digital IF signals 20b, and to
Forward resulting signal information 26 to a DSP (Digital Signal Processing) arrangement 12.

According to an example embodiment of the present invention, the first received signal information 20a is constituted by an output 28a of a DSP (Digital Signal Processing) arrangement 12 for a first radar signal cycle 4a and that the second received signal information 20b is constituted by an output 28b of the DSP arrangement 12 for a second radar signal cycle 4b, where the output 28a, 28b of the DSP arrangement 12 includes Range-Doppler matrices.

According to an example embodiment of the present invention, the vehicle radar system 3, 3' is arranged to:
Store a first output 28a of the DSP arrangement 12 for a first radar signal cycle 4a and a second output 28b of the DSP arrangement 12 for a second radar signal cycle 4b;
Calculate a difference between the first output 28a and the second output information 28b, and to; and
Forward resulting signal information 27 for further handling.

According to an example embodiment of the present invention, each radar signal cycle 4a, 4b includes an FMCW, Frequency Modulated Continuous Wave, chirp signal cycle 4a, 4b, where each chirp signal cycle 4a, 4b includes a corresponding plurality of frequency ramps r, and where each frequency ramp r is arranged to run between a first frequency $f_{start}$ and a second frequency $f_{stop}$.

Generally, the present disclosure also relates to a method for a vehicle radar system 3, 3', where the method includes:
Step 33: generating and transmitting at least a first radar signal cycle 4a and a following second radar signal cycle 4b;
Step 34: obtaining a corresponding first received signal 5a and corresponding first received signal information 20a, 28a for the first radar signal cycle 4a;
Step 35: obtaining a corresponding second received signal 5b and corresponding second received signal information 20b, 28b for the following second radar signal cycle 4b; and
Step 36: calculating a difference between the first received signal information 20a, 28a and the second received signal information 20b, 28b.

According to an example embodiment of the present invention, the method further includes:
Step 37: mixing and filtering the received signals 5a, 5b with respective transmitted radar signals 4a, 4b to obtain at least one filtered IF (Intermediate Frequency) signal 19;
Step 38: converting the filtered IF signals 17, 19 to digital IF signals 20;
Step 39: converting the digital IF signals 20 to a range domain by use of a first FFT (Fast Fourier Transform); and
Step 40: combining the results from successive radar signal cycles into the Doppler domain by use of a second FFT, such that a plurality of corresponding Range-Doppler matrices is obtained.

According to an example embodiment of the present invention, the first received signal information 20a is constituted by received digital IF signals 20a for a first radar signal cycle 4a and that the second received signal information 20b is constituted by received digital IF signals 20b for a second radar signal cycle 4b.

According to an example embodiment of the present invention, the method includes:
Step 41: storing first received digital IF signals 20a for a first radar signal cycle 4a and second received digital IF signals 20b for a second radar signal cycle 4b;

Step 42: calculating a difference between the first received digital IF signals 20a and the second received digital IF signals 20b; and Step 43: forwarding resulting signal information 26 to a DSP (Digital Signal Processing) arrangement 12.

According to an example embodiment of the present invention, the first received signal information 20a is constituted by an output 28a of a DSP, Digital Signal Processing, arrangement 12 for a first radar signal cycle 4a and that the second received signal information 20b is constituted by an output 28b of the DSP arrangement 12 for a second radar signal cycle 4b, where the output 28a, 28b of the DSP arrangement 12 includes Range-Doppler matrices.

According to an example embodiment of the present invention, the method includes:

Step 44: storing a first output 28a of the DSP arrangement 12 for a first radar signal cycle 4a and a second output 28b of the DSP arrangement 12 for a second radar signal cycle 4b;

Step 45: calculating a difference between the first output 28a and the second output information 28b; and Step 46: forwarding resulting signal information 27 for further handling.

According to an example embodiment of the present invention, each radar signal cycle 4a, 4b uses an FMCW (Frequency Modulated Continuous Wave) chirp signal cycle 4a, 4b, where each chirp signal cycle 4a, 4b has a corresponding plurality of frequency ramps r, and where each frequency ramp r is intended to run between a first frequency $f_{start}$ and a second frequency $f_{stop}$.

While the above description constitutes the preferred embodiment of the present invention, it will be appreciated that the invention is susceptible to modification, variation and change without departing from the proper scope and fair meaning of the accompanying claims.

The invention claimed is:

1. A vehicle radar system comprising: a transceiver arrangement that is arranged to generate and transmit at least a first radar signal and a following second radar signal, where, for the first radar signal, a corresponding first received signal and a corresponding first received signal information is obtained, and for the following second radar signal, a corresponding second received signal and a corresponding second received signal information is obtained, the vehicle radar system is arranged to calculate a difference between the first received signal information and the second received signal information;

wherein the vehicle radar system is arranged to:
 mix and filter the first and second received signals with respective transmitted first and second radar signals to obtain at least one filtered Intermediate Frequency signal;
 convert the at least one filtered Intermediate Frequency signal to respective digital Intermediate Frequency signals;
 convert the digital Intermediate Frequency signals to a range domain by use of a first Fast Fourier Transform; and
 combine the results from successive cycles of the radar signals into a Doppler domain by use of a second Fast Fourier Transform, such that a plurality of corresponding Range-Doppler matrices is obtained.

2. The vehicle radar system according to claim 1, further comprising, the first received signal information is constituted by a first received digital Intermediate Frequency signal for the first radar signal and that the second received signal information is constituted by a second received digital Intermediate Frequency signal for the second radar signal.

3. The vehicle radar system according to claim 2, further comprising the vehicle radar system is arranged to:
 store the first received digital Intermediate Frequency signal for the first radar signal and the second received digital Intermediate Frequency signal for the second radar signal;
 calculate a difference between the first received digital Intermediate Frequency signal and the second received digital Intermediate Frequency signal; and
 to forward resulting signal information to a Digital Signal Processing arrangement.

4. The vehicle radar system according to claim 1, further comprising, the first received signal information is constituted by a first output of a Digital Signal Processing arrangement for the first radar signal and that the second received signal information is constituted by a second output of the Digital Signal Processing arrangement for a second radar signal, where the outputs of the Digital Signal Processing arrangement include Range-Doppler matrices.

5. The vehicle radar system according to claim 4, further comprising that the vehicle radar system is arranged to:
 store the first output of the Digital Signal Processing arrangement for the first radar signal and the second output of the Digital Signal Processing arrangement for the second radar signal;
 calculate a difference between the first output and the second output information; and
 to forward a resulting third signal information for further handling.

6. The vehicle radar system according to claim 1, wherein each of the radar signals include a Frequency Modulated Continuous Wave chirp signal where each of the chirp signals include a corresponding plurality of frequency ramps and where each of the frequency ramps are arranged to run between a first frequency and a second frequency.

7. A vehicle radar system according to claim 1, further comprising, the first and the second radar signals occurring during respective first and second cycles.

8. A method for a vehicle radar system where the method includes the steps of:
 generating and transmitting at least a first radar signal and a following second radar signal;
 obtaining a corresponding first received signal and a corresponding first received signal information for the first radar signal;
 obtaining a corresponding second received signal and a corresponding second received signal information for the following second radar signal and;
 calculating a difference between the first received signal information and the second received signal information;
 mixing and filtering the first and second received signals with the respective transmitted first and second radar signals to obtain at least one filtered, Intermediate Frequency signal;
 converting the filtered Intermediate Frequency signal to a digital Intermediate Frequency signal;
 converting the digital Intermediate Frequency signal to a range domain by use of a first Fast Fourier Transform; and
 combining the results from successive cycles of the radar signals into a Doppler domain by use of a second Fast Fourier Transform, such that a plurality of corresponding Range-Doppler matrices is obtained.

9. The method according to claim 8, further comprising, the first received signal information is constituted by a received digital Intermediate Frequency signal for the first radar signal and the second received signal information is constituted by a received digital Intermediate Frequency signal for the second radar signal.

10. The method according to claim 9, further comprising:
storing the first received digital Intermediate Frequency signal for the first radar signal and the second received digital Intermediate Frequency signal for the second radar signal;
calculating a difference between the first received digital Intermediate Frequency signal and the second received digital Intermediate Frequency signal; and
forwarding resulting signal information to a Digital Signal Processing arrangement.

11. The method according to claim 8, further comprising, the first received signal information is constituted by an output of a Digital Signal Processing arrangement for the first radar signal and that the second received signal information is constituted by an output of the Digital Signal Processing arrangement for the second radar signal, where the output of the Digital Signal Processing arrangement includes Range-Doppler matrices.

12. The method according to claim 11, further comprising:
storing a first output of the DSP Digital Signal Processing arrangement for the first radar signal and a second output of the Digital Signal Processing arrangement for the second radar signal;
calculating a difference between the first output and the second output information; and
forwarding a resulting signal information for further handling.

13. The method according to claim 8, further comprising that the first and second radar signals use a Frequency Modulated Continuous Wave chirp signal, where the chirp signal has a corresponding plurality of frequency ramps, and where each frequency ramp is intended to run between a first frequency and a second frequency.

14. A method for a vehicle radar system according to claim 8, further comprising, the first and the second radar signals occurring during respective first and second cycles.

* * * * *